United States Patent [19]

Tate et al.

[11] Patent Number: 5,091,143
[45] Date of Patent: Feb. 25, 1992

[54] NATURAL CIRCULATION REACTOR

[75] Inventors: Hitoshi Tate; Fumio Totsuka; Tetuo Horiuchi; Kumiaki Moriya, all of Hitachi, Japan

[73] Assignee: Hitachi, Ltd., Tokyo, Japan

[21] Appl. No.: 363,877

[22] Filed: Jun. 9, 1989

[30] Foreign Application Priority Data

Jun. 16, 1988 [JP] Japan .................. 63-148513

[51] Int. Cl.⁵ .................. G21C 15/18
[52] U.S. Cl. .................. 376/282; 376/299; 376/328
[58] Field of Search .............. 376/283, 282, 298, 299, 376/279, 328, 406, 210, 211

[56] References Cited

U.S. PATENT DOCUMENTS

| 4,022,655 | 5/1977 | Gauditz et al. | 376/283 |
| 4,363,780 | 12/1982 | Hannerz | 376/282 |
| 4,526,742 | 7/1985 | Hannerz | 376/282 |
| 4,696,791 | 9/1987 | Straub | 376/299 |
| 4,793,964 | 12/1988 | Fajeau | 376/406 |

FOREIGN PATENT DOCUMENTS

| 122097 | 10/1978 | Japan | 376/283 |
| 228197 | 10/1987 | Japan . | |
| 200098 | 8/1988 | Japan . | |
| 229390 | 9/1988 | Japan . | |
| 91089 | 4/1989 | Japan | 376/283 |

OTHER PUBLICATIONS

Japanese Nuclear Society, "Annual Meeting of 1987", E44, Apr. 1-3.
Nuclear Reactor Engineering, Glasstone et al., 1981.

Primary Examiner—Daniel D. Wasil
Attorney, Agent, or Firm—Antonelli, Terry, Stout & Kraus

[57] ABSTRACT

The invention is directed to a natural circulation reactor having a reactor pressure vessel with a core housed therein, the core being disposed in such a location that a top portion of the core is submerged under coolant even in the event that any pipe connected to the reactor pressure vessel is broken and then a coolant level in the reactor pressure vessel is lowered due to flushing. This permits the reactor core to be submerged under coolant even in the event of breakage of any pipe connected to the reactor pressure vessel, ensuring to eliminate a possibility that the top portion of the reactor core is exposed temporarily during an intermediate period before actuation of an accumulated coolant injection system to start injecting of the coolant into the reactor pressure vessel after the end of flushing.

7 Claims, 3 Drawing Sheets

FIG. I

NATURAL CIRCULATION REACTOR

BACKGROUND OF THE INVENTION

The present invention relates to a natural circulation reactor and, more particularly, to a natural circulation reactor suitable for maintaining a reactor core submerged under coolant even on the supposition of breakage of any pipe connected to a pressure vessel of the reactor.

As described in "Annual Meeting of 1987", Japanese Nuclear Society, Corp., (at Nagoya University, Apr. 1-3, 1987), E44, Conceptual Study of Natural Circulation BWR - (1) Plant Outline, a conventional natural circulation reactor has been designed to inject light water from a tank of an accumulated coolant injection system on the supposition of breakage of any pipe connected to a pressure vessel of the reactor.

SUMMARY OF THE INVENTION

On the supposition of breakage of any pipe connected to the reactor pressure vessel in the aforementioned reactor of prior art, a coolant, i.e., light water, within the reactor pressure vessel would be flushed in response to abrupt decompression caused by blowdown upon breakage of any pipe of large diameter, or in response to abrupt decompression caused by startup of an automatic decompressing system (ADS) upon breakage of any pipe of small diameter, whereby a large amount of coolant is discharged from the reactor pressure vessel. Accordingly, there is a possibility of exposing a top portion of the reactor core temporarily during an intermediate period before actuation of the accumulated coolant injection system to start injecting of a coolant into the reactor core, because the coolant level in the reactor is lowered as voids fail to occur after the completion of flushing.

Further, in long-term cooling situations when a residual heat removal system is actuated in a core cooling mode to inject a coolant within a pressure suppressing chamber into the reactor core after the reactor has been decompressed completely, the coolant level in the reactor is elevated with the coolant injected, and the coolant is flown out from the broken part. At this time, there is a possibility that a portion of the coolant may be flown out from the broken part directly as it remains at a low temperature without acting to cool the reactor core, and hence the decay heat generated from the reactor core may not be removed efficiently. Accordingly, the prior art has been required to set a flow rate of the residual heat removal system and the capacity of a heat exchanger as to leave a sufficient allowance.

It is an object of the present invention to provide a natural circulation reactor which can maintain a core in a reactor pressure vessel submerged under coolant even on the supposition of breakage of any pipe connected to the reactor pressure vessel.

To achieve the above object, the present invention provides a natural circulation reactor having a reactor pressure vessel with a core housed therein, the core being disposed in such a location that a top portion of the core is submerged under coolant even in the event that any pipe connected to said reactor pressure vessel is broken and then a coolant level in the reactor pressure vessel is lowered due to flushing.

In accordance with the present invention as arranged above, the reactor core will be submerged under coolant and hence will never be exposed even during an intermediate period before actuation of the accumulated coolant injection system subsequent to flushing, although the coolant present in the reactor core would be flushed and lost from the reactor pressure vessel in response to abrupt decompression caused by blowdown through the broken part of any pipe or by start-up of an automatic decompressing system (ADS), thereby lowering a coolant level in the reactor after the completion of flushing, on the supposition of breakage of any pipe connected to the reactor pressure vessel.

Furthermore, after the completion of flushing, the accumulated coolant injection system is actuated to inject a coolant from an accumulated coolant injection tank, and then a residual heat removal system starts its operation to inject a coolant in a pressure suppressing chamber. The coolant thus injected into the reactor pressure vessel is flown out of the reactor pressure vessel while keeping the reactor core submerged under coolant. The outflowing coolant is transferred to a lower drywell surrounding a lower portion of the reactor pressure vessel for filling the lower drywell with the coolant. Herein, the reactor core is disposed below a level of passage holes of the lower drywell, while as the amount of the coolant filled in the lower drywell is increased, the resulting level of the coolant is elevated beyond a position of the reactor core. Afterward, the coolant is flown out through the passage holes into the pressure suppressing chamber. Accordingly, although a portion of the coolant injected into the reactor pressure vessel is flown out of the reactor pressure vessel from the broken part directly as it remains at a low temperature without removing any decay heat of the reactor core, the coolant at a low temperature is pooled in the lower drywell and utilized to cool the wall surface of the reactor pressure vessel from its outside, thereby in turn cooling the reactor core. Thus, the decay heat generated from the reactor core is removed reliably and efficiently.

DETAILED DESCRIPTION OF PREFERRED EMBODIMENT

Hereinafter, the present invention will be described in connection with a preferred embodiment by referring to FIGS. 1-3.

Figure 1:
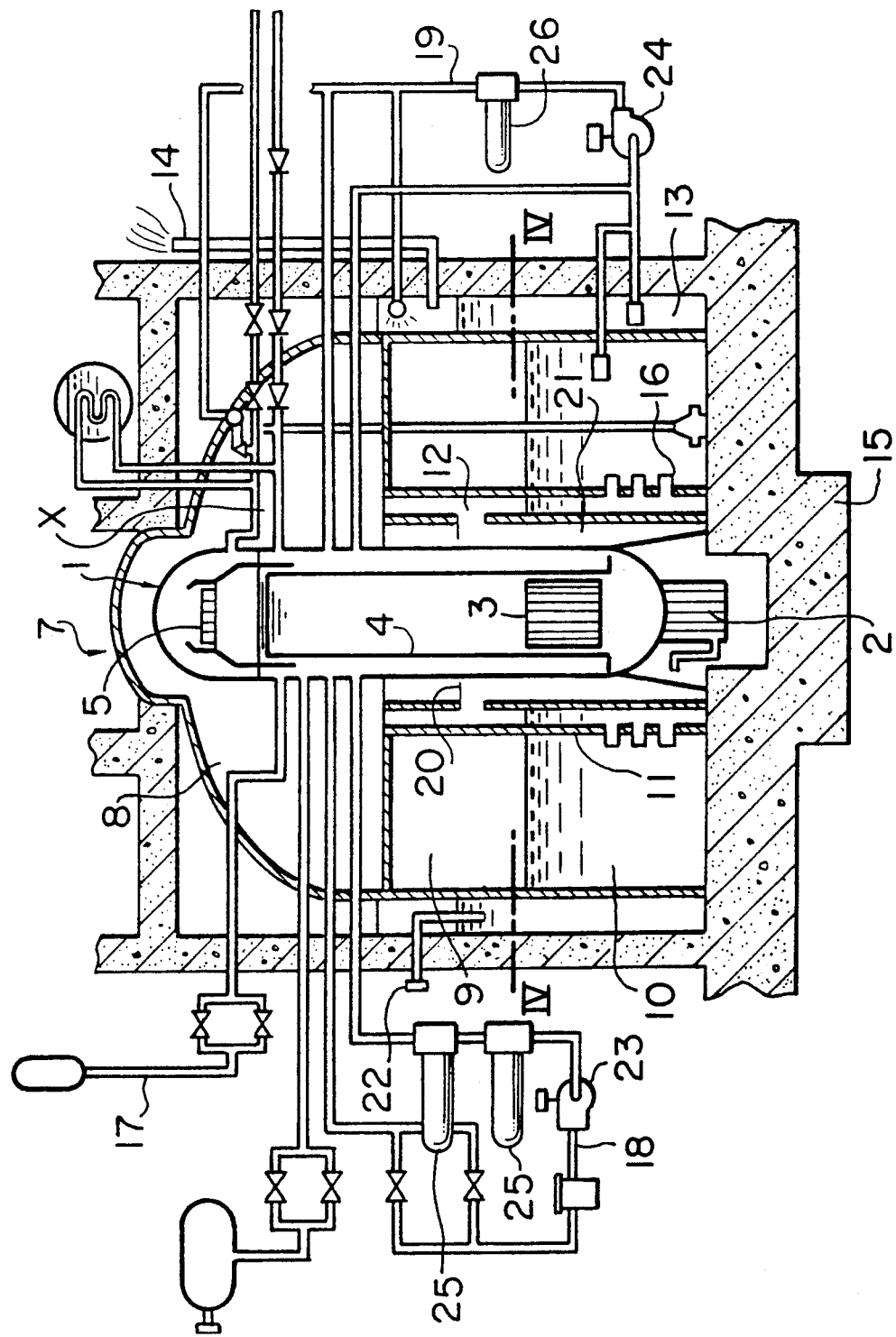
FIG. 1 is a vertical sectional view of a reactor container which incorporates therein a reactor pressure vessel according to the present invention.
Figure 4:
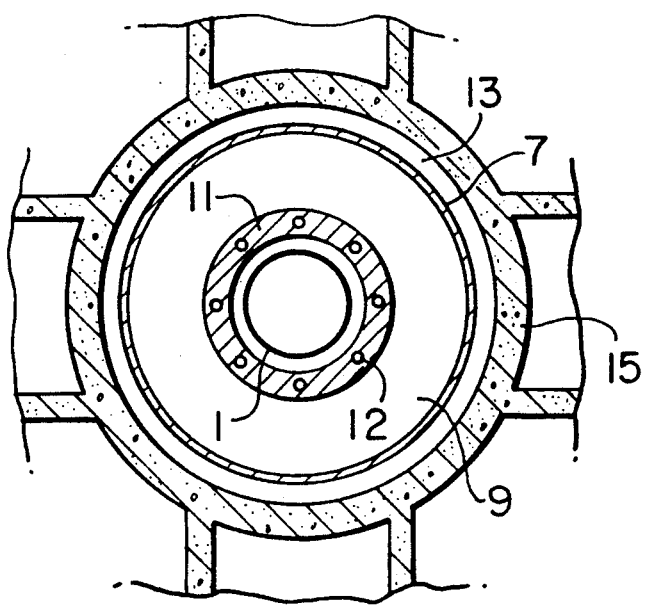
FIG. 4 is a schematic sectional view of the reactor container taken along line IV—IV in FIGS. 1 and 2.

In FIG. 1, a reactor pressure vessel 1 constituting a natural circulation reactor is disposed within a reactor container 7 supported on a base concrete mat 15. The reactor container 7 includes a drywell 8, a pressure suppressing chamber 9, a coolant pool 10 within the pressure suppressing chamber, a pedestal 11, vent pipes 12 as more clearly illustrated in FIG. 4, and horizontal vents 16. The drywell 8 is communicated with the pressure suppressing chamber 9 through passage holes 20. A peripheral pool 13 disposed on the outer side of the reactor container 7 is connected to a make-up coolant line 22 for the peripheral pool 13, and also communicated with the exterior through a vent pipe 14 for the peripheral pool 13. The reactor pressure vessel 1 is connected to an accumulated coolant injection system 17, a residual heat removal and cleaning system 18, and a residual heat removal system 19 through respective pipes. The accumulated coolant injection system 17 is actuated in response to a reduction of the reactor pressure down to a certain level upon breakage of any pipe connected to the reactor pressure vessel 1, for injecting a coolant into the reactor pressure vessel 1. The residual heat removal systems 18, 19 have respective pumps 23, 24 and heat exchangers 25, 26, and are actuated in an emergency type situation in response to a full reduction of the reactor pressure upon breakage of any pipe connected to the reactor pressure vessel, for removing the decay heat generated from the reactor core. At this time, the residual heat removal system 19 injects a coolant from the coolant pool 10 within the pressure suppressing chamber 10 into the reactor pressure vessel 1.

Figure 3:
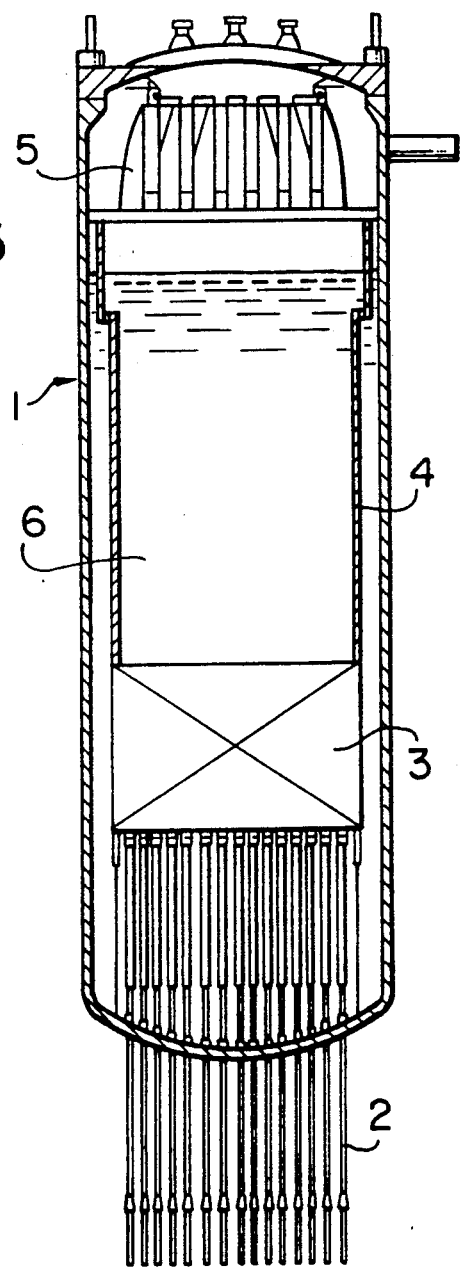
FIG. 3 is a longitudinal sectional view of the reactor pressure vessel.

As illustrated in FIG. 3, the reactor pressure vessel 1, which is shown as having a metallic wall, includes a group of fuel control rods 2, a reactor core 3, a steam chimney 4, and a steam drier 5. A coolant 6 is filled in the reactor pressure vessel 1 so that the reactor core 3 is submerged under the coolant 6. Steam produced from the reactor core 3 flows into a turbine through the steam drier 5 and a main steam pipe (not shown) both positioned above the coolant 6. In this embodiment, as described in detail below, the reactor core 3 is installed below the level of the coolant as established when the amount of the coolant 6 within the reactor pressure vessel 1 is reduced down to 60% of the total capacity. Moreover, under the state where the reactor pressure vessel 1 is installed in the reactor container 7, the reactor core 3 is preferably positioned below the passage holes 20 as seen from FIG. 1. This means a feature that the position of the reactor core 3 in the present invention is lower than that in the prior art.

Figure 2:
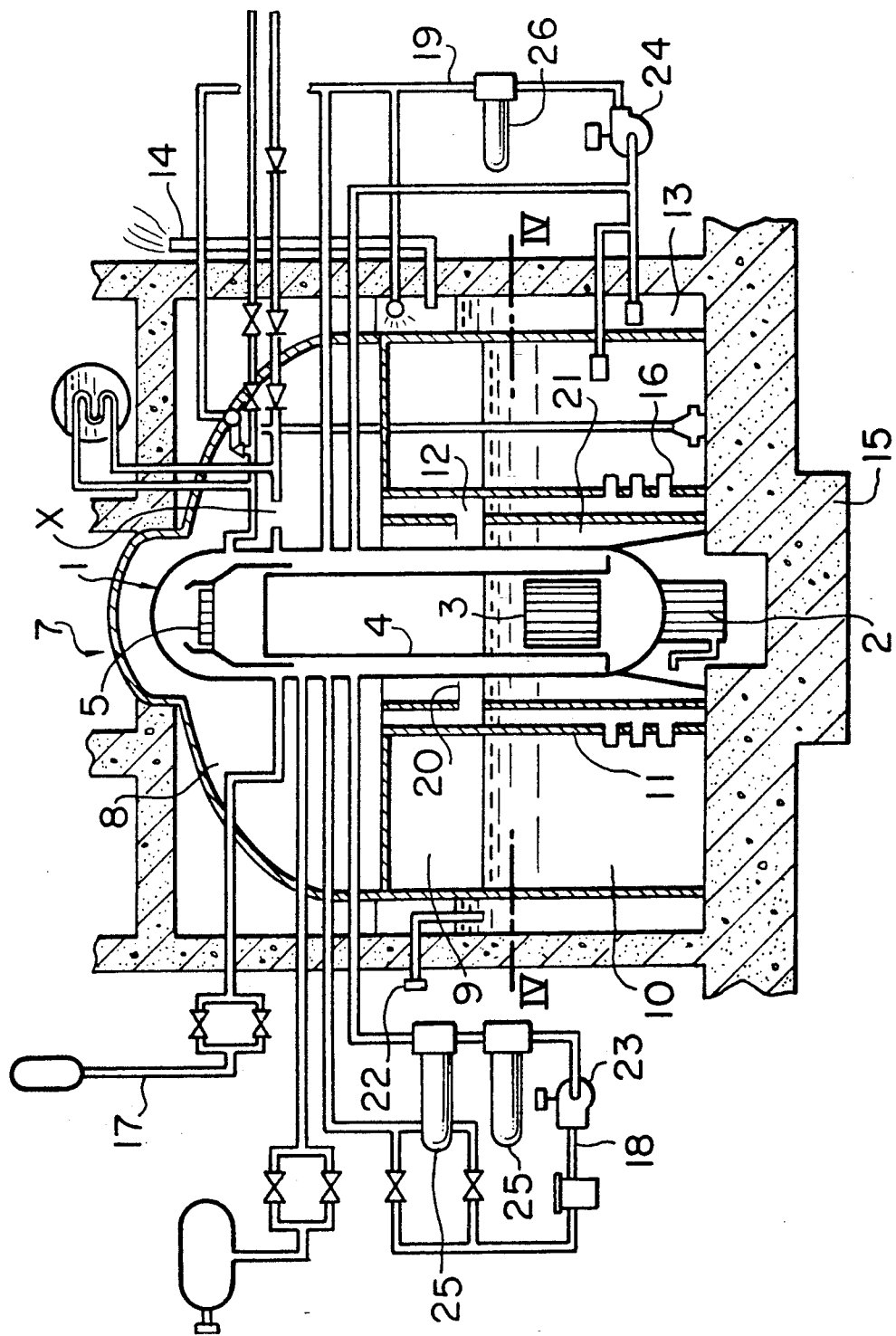
FIG. 2 is a vertical sectional view of a reactor container of FIG. 1 showing breakage X of a pipe and the coolant levels in accordance with the present invention.

In the natural circulation reactor thus constructed, the coolant 6 in the reactor pressure vessel 1 would be flushed in response to abrupt decompression within the reactor pressure vessel and discharged to the outside thereof, on the supposition of breakage X of any pipe of large diameter connected to the reactor pressure vessel 1 as shown in FIG. 2. The discharged amount of the coolant is about 40% of the total amount of the coolant before discharge of vapor (i.e., before breakage of any pipe of large diameter). Theoretical calculation is as follows.

$$e = (ET - EW)/(ES - EW)$$

where
e: evaporation rate of coolant
ET: enthalpy of coolant (Kcal/Kg)
ES: enthalpy of steam at atmospheric pressure (Kcal/Kg)
EW: enthalpy of water at atmospheric pressure (Kcal/Kg)

Since the pressure within the reactor pressure vessel is 80 ata during normal operation and the atmospheric pressure is 1 ata, ET, ES and EW are given by 313.314 Kcal/Kg, 639.15 Kcal/Kg and 100.092 Kcal/Kg, respectively.

Therefore, the evaporation rate of coolant e is given by:

$$e = (313.314 - 100.092)/(639.15 - 100.092)$$
$$= 0.396$$

In other words, more than 60% of the total amount of coolant remains. Accordingly, on the supposition of breakage X of a pipe of large diameter connected to the reactor pressure vessel 1 as shown in FIG. 2; the reactor core 3 installed below the level of the coolant as established when the amount of the coolant is reduced down to 60%, will be kept submerged under coolant even after the coolant 6 is flushed. Afterward, the coolant starts evaporating due to the decay heat from the reactor core, causing a level of the coolant to be further lowered. On the other hand, at the time when the pressure within the reactor is reduced down to 5 atg, the accumulated coolant injection system 17 is actuated to inject the coolant from the accumulated coolant injection tank into the reactor pressure vessel 1 for keeping the reactor core 3 submerged under coolant. Thereafter, when the interior of the reactor pressure vessel is fully decompressed down to the atmospheric pressure, the residual heat removal systems 18, 19 now come into operation so that the reactor pressure vessel is brought into a long-term cooling mode. Since then, the residual heat removal system 19 operates to inject the coolant from the coolant pool 10 within the pressure suppressing chamber into the reactor pressure vessel 1 through the heat exchanger 23, thereby raising a level of the coolant in the reactor pressure vessel. The injected coolant is flown out from the broken part of the pipe to the outside of the reactor pressure vessel 1, while keeping the reactor core 3 submerged under coolant, and then accumulated in a lower drywell 21 surrounding a lower portion of the reactor pressure vessel 1. Once the coolant level in the lower drywell 21 reaches the passage holes 20, the coolant continuously flows out of the passage holes 20 into the pressure suppressing chamber 9 through the vent pipes 12 and the horizontal vents 16. With such circulation of the coolant, the coolant levels in both the pressure suppressing chamber 9 and the lower drywell 21 are maintained nearly at a level of the passage holes 20 as shown in FIG. 2.

Most of the coolant at a low temperature injected into the reactor pressure vessel 1 from the residual heat removal system 19 flows downwardly along the outer surface of the steam chimney 4, and then passes through the reactor core 3 upwardly from its bottom while being increased in the temperature by removing the decay heat of the reactor core 3. A portion of the coolant 6 injected from the residual heat removal system 19 into the reactor pressure vessel 1 bypasses the reactor core, and flows out from the broken part of the pipe directly as it remains at a low temperature. Accordingly, the coolant flown out and accumulated in the lower drywell 21 surrounding the lower portion of the reactor pressure vessel 1 has a temperature lower than that of the coolant in the reactor pressure vessel 1.

In the prior art where a reactor core is positioned above a level of the coolant in a lower drywell, it is not only required to inject a sufficiently ample amount of coolant for compensating a portion of the coolant injected from a residual heat removal system 19 into a reactor pressure vessel that bypasses the reactor core to flow toward the broken part of the pipe without passing through a steam chimney downwardly, but also forced for a heat exchanger of a residual heat removal system to cool the coolant at a low temperature that enters a pressure suppressing chamber through passage holes from the lower drywell as it remains at a low temperature without acting to cool the reactor core. Consequently, the efficiency of the heat exchanger is lowered and the low temperature of the coolant is not utilized sufficiently for cooling the reactor core.

In the foregoing embodiment of the present invention, when the coolant level in the lower drywell 21 increases up to the passage holes 20 with outflow of the coolant incidental to injection from both the accumulated coolant injection system 17 and the residual heat removal system 19, the reactor core 3 is positioned below a level of the coolant in the lower drywell 21 because the passage holes 20 are located above the reactor core 3. With such arrangement, even though the coolant injected from the residual heat removal system 19 is flown out of the reactor pressure vessel 1 in a state of low temperature while bypassing the reactor core 3, the coolant accumulated in the lower drywell 21 can be utilized to indirectly cool the reactor core 3 from the outer side of the reactor pressure vessel 1 via the wall thereof through heat exchange with the coolant 6 of higher temperature in the reactor pressure vessel. In this manner, the coolant which has flown out bypassing the reactor core 3 also contributes to cooling of the reactor core, thereby improving removal efficiency of the decay heat.

Furthermore, the coolant heated to a higher temperature through heat exchange with the coolant in the reactor pressure vessel 1 tends to move toward the upper portion of the coolant pool residing in the lower drywell 21, so that the coolant of higher temperature selectively flows into the pressure suppressing chamber 9 through the passage holes 20, and this increases a temperature of the coolant in the pressure suppressing chamber 9. Accordingly, the coolant of higher temperature is subjected to heat exchange in the residual heat removal system 19, with the result that heat exchange efficiency of the residual heat removal system 19 is improved, allowing a heat exchanger of small size to offer the sufficient effect.

According to the present invention, as stated abOVe, since the reactor core can be maintained submerged under coolant even in the event of breakage of any pipe connected to the reactor pressure vessel, it is ensured to eliminate a possibility that the top portion of the reactor core is exposed temporarily during an intermediate period before actuation of the accumulated coolant injection system to start injecting of the coolant into the reactor pressure vessel after the end of flushing.

In addition, with the core in the reactor pressure vessel positioned below a level of the passage holes for the lower drywell, the coolant of low temperature flowing out of the reactor pressure vessel and accumulated in the lower drywell after the completion of flushing serves to cool the wall surface of the reactor pressure vessel from its outside, thereby in turn cooling the reactor core. Thus, the decay heat generated in the reactor core can be removed reliably and efficiently.

What is claimed is:

1. A natural circulation reactor providing natural circulation of coolant through a core without an external circulation force during normal operation of the reactor, comprising a reactor pressure vessel having the core housed therein and a reactor container having a wetwell and a drywell, said pressure vessel being located in a portion of the drywell centered in the wetwell, wherein the core is disposed at a position below a predetermined level of coolant in said pressure vessel so that a top portion of the core is maintained to be submerged below the coolant even in the event that any pipe connected to said pressure vessel is broken and a coolant level in said reactor pressure vessel is then lowered to the predetermined level by flushing as a result of pipe breakage.

2. A natural circulation reactor according to claim 1, wherein said pressure vessel is metallic, the top portion of said core being arranged at a position lower than passage holes between said portion of the drywell and vent pipes so that a level of the coolant outside of said pressure vessel is higher than the top portion of said core, and heat exchange between inside and outside of said pressure vessel at a level corresponding to that of the position of said core is performed between inner coolant and outer coolant of said pressure vessel through said metallic pressure vessel due to transmission of heat between the inner coolant and the outer coolant so that said core is cooled efficiently from outside of said pressure vessel.

3. A natural circulation reactor according to claim 2, further including at least one coolant injection system for preventing an accident of decrease in a level of the coolant due to breakage of a pipe, said system having a volume of coolant sufficient to maintain coolant in both the wetwell and a lower portion of the drywell at a level of the passage holes in the vent pipes so as to enable cooling of said core in said pressure vessel.

4. A natural circulation reactor according to claim 1, wherein the predetermined level of coolant in said pressure vessel is a minimized level of coolant when the level of coolant in said pressure vessel is lower by flushing due to breakage of at least one pipe connected to said pressure vessel.

5. A natural circulation reactor for enabling natural circulation of coolant through a core without an external circulation force during a normal operation of the reactor, comprising a reactor container having a wetwell and a drywell and a reactor pressure vessel having the core housed therein, the pressure vessel being located in a portion of the drywell centered in the wetwell and being disposed and configured so as to maintain a level of coolant in the pressure vessel above a top portion of the core even when a level of coolant in the pressure vessel is lowered by flushing due to breakage of at least one pipe connected to the pressure vessel such that the top portion of the core remains submerged beneath the level of coolant in the pressure vessel when the coolant level is lowered by flushing.

6. A natural circulation reactor according to claim 5, wherein the pressure vessel has a metallic wall, the top portion of said core being disposed at a position within the pressure vessel lower than passage holes between the portion of the drywell and vent pipes so that a level of the coolant outside of the pressure vessel is higher than the top portion of the core, the metallic wall of the pressure vessel together with the coolant inside and outside of the pressure vessel at a level corresponding to that of the position of the core enabling heat exchange between the coolant inside and outside of the pressure vessel through the metallic wall, thereby effecting cooling of the core from the outside of the pressure vessel.

7. A natural circulation reactor according to claim 6, further comprising at least one emergency system for being activated in response to an abnormal operation including breakage of a pipe and including at least one coolant injection means for preventing an accident of decrease in a level of coolant within the pressure vessel due to breakage of the pipe, the coolant injection means having a volume of coolant sufficient to maintain coolant in both the wetwell and a lower portion of the drywell at a level of the passage holes in the vent pipes so as to enable cooling of the core in the pressure vessel.

* * * * *